(12) United States Patent
Oh et al.

(10) Patent No.: US 11,878,642 B2
(45) Date of Patent: Jan. 23, 2024

(54) VEHICLE BACK BEAM AND VEHICLE INCLUDING SAME

(71) Applicant: LG Hausys, Ltd., Seoul (KR)

(72) Inventors: Ae-Ri Oh, Seoul (KR); Jong-Sung Park, Seoul (KR); Hee-June Kim, Seoul (KR); Han-Na Choi, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 501 days.

(21) Appl. No.: 16/606,320

(22) PCT Filed: Mar. 29, 2018

(86) PCT No.: PCT/KR2018/003727
§ 371 (c)(1),
(2) Date: Oct. 18, 2019

(87) PCT Pub. No.: WO2018/194287
PCT Pub. Date: Oct. 25, 2018

(65) Prior Publication Data
US 2021/0370857 A1 Dec. 2, 2021

(30) Foreign Application Priority Data
Apr. 18, 2017 (KR) .......................... 10-2017-0049948

(51) Int. Cl.
*B60R 19/03* (2006.01)
*B32B 5/12* (2006.01)
(Continued)

(52) U.S. Cl.
CPC ............... *B60R 19/03* (2013.01); *B32B 5/12* (2013.01); *B32B 5/26* (2013.01); *B32B 27/08* (2013.01);
(Continued)

(58) Field of Classification Search
CPC . B60R 19/03; B60R 19/24; B60R 2019/1853; B32B 5/12; B32B 5/26;
(Continued)

(56) References Cited

U.S. PATENT DOCUMENTS

| | | | |
|---|---|---|---|
| 6,355,584 B1* | 3/2002 | Corrons | D04H 3/04 442/104 |
| 2012/0228888 A1* | 9/2012 | Krammer | B60R 19/12 293/133 |

FOREIGN PATENT DOCUMENTS

| | | | |
|---|---|---|---|
| JP | 2010-138953 A | 6/2010 | |
| JP | 2016-124299 A | 7/2016 | |

(Continued)

OTHER PUBLICATIONS

Karger-Kocsis, Jozef, "Glass mat reinforced thermoplastic polypropylene" excerpt from Polypropylene: an A-Z reference, Kluwer Publisher, pp. 284-290 1999 (Year: 1999).*

(Continued)

*Primary Examiner* — Alicia J Weydemeyer
*Assistant Examiner* — Laura B Figg
(74) *Attorney, Agent, or Firm* — Hauptman Ham, LLP

(57) ABSTRACT

Disclosed are a vehicle back beam capable of maximizing impact performance and reducing product weight; and a vehicle including same. According to one embodiment of the present invention, provided is a vehicle back beam which includes: a back beam body; and a back beam reinforcing part which is formed in at least one section of the back beam body and composed of a highly deformable composite material.

2 Claims, 3 Drawing Sheets

(51) Int. Cl.
  *B32B 5/26* (2006.01)
  *B32B 27/08* (2006.01)
  *B32B 27/32* (2006.01)
  *B60R 19/24* (2006.01)
  *B60R 19/18* (2006.01)

(52) U.S. Cl.
  CPC .............. *B32B 27/32* (2013.01); *B60R 19/24* (2013.01); *B32B 2260/023* (2013.01); *B32B 2260/046* (2013.01); *B32B 2262/101* (2013.01); *B32B 2305/10* (2013.01); *B32B 2307/558* (2013.01); *B32B 2307/56* (2013.01); *B32B 2605/08* (2013.01); *B60R 2019/1853* (2013.01)

(58) Field of Classification Search
  CPC ... B32B 27/08; B32B 27/32; B32B 2260/023; B32B 2260/046; B32B 2262/101; B32B 2305/10; B32B 2307/558; B32B 2307/56; B32B 2605/08
  See application file for complete search history.

(56) References Cited

FOREIGN PATENT DOCUMENTS

| | | |
|---|---|---|
| KR | 10-0814862 B1 | 3/2008 |
| KR | 10-2014-0085479 A | 7/2014 |
| KR | 10-2015-0018729 A | 2/2015 |
| KR | 10-2015-0044187 A | 4/2015 |
| KR | 10-2016-0133605 A | 11/2016 |
| WO | 2004-068059 A1 | 8/2004 |
| WO | 2004068059 A1 | 8/2004 |

OTHER PUBLICATIONS

Korean Office Action dated Mar. 17, 2021 in connection with the Korean Patent Application No. 10-2017-0049948.
International Search Report dated Jul. 16, 2018, in connection with International Patent Application No. PCT/KR2018/003727.
Korean Office Action dated Jan. 16, 2020 corresponding to Korean Application No. 10-2017-0049948 without english translation.

* cited by examiner

A – A'

VEHICLE BACK BEAM AND VEHICLE INCLUDING SAME

CROSS-REFERENCE TO RELATED APPLICATION

The present application is a national stage filing under 35 U.S.0 § 371 of PCT application number PCT/KR2018/003727 filed on Mar. 29, 2018 which is based upon and claims the benefit of priority to Korean Patent Application No. 10-2017-0049948 filed on Apr. 18, 2017, in the Korean Intellectual Property Office, which is incorporated herein in its entirety by reference.

TECHNICAL FIELD

Embodiments of the present disclosure relate to a vehicle back beam and a vehicle including the same, and more specifically, to a vehicle back beam and a vehicle including the same in which the back beam is lightweight and has maximized impact performance using a reinforced composite having high elongation and energy absorption.

BACKGROUND ART

Recently, there has been a great interest in energy saving due to rising oil price. Correspondingly, one of important factors is to reduce a weight of a vehicle and thus improve fuel economy in a vehicle.

Most of components constituting the vehicle are made of metal to secure high strength and rigidity. However, when the components are made of the metal material, a manufacturing process thereof is expensive, and due to its large weight, there are disadvantages in improving fuel efficiency or reducing a weight.

Therefore, in recent years, various parts of the vehicle have been manufactured using plastic instead of the metal for the weight reduction. Plastics generally have a specific gravity of about ¼ to about ⅕ of metals, and thus may be lightened to improve fuel economy. However, the metal has a high resistance to fracture. This delays complete breakdown of the metal part even after reaching a maximum strength via permanent deformation by an external force. The metal stores energy in deformation and has large deformation. In contrast, the plastic materials exhibit a behavior in which a fracture thereof occurs rapidly after reaching the maximum strength of the material at a very small elongation. When external force is applied thereto, no permanent deformation occurs before breaking. The deformation degree is small.

Further, a back beam (or 'bumper back beam') among the vehicle parts is used as shock absorbing means for absorbing an impact force by elastic deformation during collision of the vehicle to minimize physical damage of the vehicle and to improve occupant safety.

A conventional back beam is mainly made of steel material of high rigidity/strength. However, the steel may have lower specific strength/rigidity than those of a fiber reinforced composite. Nevertheless, the steel with high elongation has high impact absorption energy and is mainly used for energy absorbing parts such as back beams.

However, the steel based back beam has a problem of lowering driving performance and fuel efficiency of the vehicle due to weight increase.

A prior art literature related to the present disclosure includes Korean Patent Application Publication No. 10-2015-0018729 (published on Feb. 24, 2015) which discloses a bumper back beam for a vehicle.

DISCLOSURE

Technical Purpose

One purpose of the present disclosure is to provide a vehicle back beam in which a large-deformable composite with high elongation and energy absorption performance while securing required mechanical strength and rigidity is used for the back beam, such that collision performance of the back beam is maximized and a weight of the back beam is reduced.

Another purpose of the present disclosure is to provide a vehicle including a vehicle back beam in which the large-deformable composite is used for the back beam, such that collision performance of the back beam is maximized and a weight of the back beam is reduced.

Purposes of the present disclosure are not limited to the above-mentioned purpose. Other purposes and advantages of the present disclosure as not mentioned above may be understood from following descriptions and more clearly understood from embodiments of the present disclosure.

Technical Solutions

A first aspect of the present disclosure provides a vehicle back beam comprising: a back beam body; and a back beam reinforcing portion formed across at least one section of the back beam body, wherein the back beam reinforcing portion includes a large-deformable composite.

In one implementation of the first aspect, the large-deformable composite extends across at least one of a horizontal section or a vertical section of the back beam body.

In one implementation of the first aspect, the large-deformable composite includes a laminate in which a plurality of fiber reinforced sheets are vertically stacked, wherein each of the fiber reinforced sheets includes reinforcing fibers having an extension orientation, and a resin matrix, wherein the plurality of fiber reinforced sheets include: at least one first fiber reinforced sheet including reinforcing fibers having a first orientation having an angle of +1° to +45° with respect to a reinforcement required direction; and at least one second fiber reinforced sheet including reinforcing fibers having a second orientation having an angle of −1° to −45° with respect to the reinforcement required direction.

In one implementation of the first aspect, the plurality of fiber reinforced sheet is free of a fiber reinforced sheet including reinforcing fibers having an orientation having an angle of 0° or 90° with respect to the reinforcement required direction.

In one implementation of the first aspect, the laminate includes the first fiber reinforced sheet and the second fiber reinforced sheet at a lay-up ratio of 1:1, 1:2, or 2:1.

In one implementation of the first aspect, the reinforcing fibers include continuous fibers.

In one implementation of the first aspect, the reinforcing fibers include one selected from a group consisting of glass fibers, carbon fibers, aramid fibers, polypropylene fibers, polyethylene terephthalate fibers, polybutylene terephthalate fibers, polyethylene fibers, natural fibers, and combinations thereof.

In one implementation of the first aspect, the resin matrix includes a thermoplastic resin or thermosetting resin.

In one implementation of the first aspect, the resin matrix includes one selected from a group consisting of polypropylene (PP) resin, polyethylene terephthalate (PET) resin, polyethylene (PE) resin, polyamide (PA) Resin, polytetrafluoroethylene (PTFE) resin, polystyrene (PS) resin, polyphenylene oxide (PPO) resin, polyvinyl chloride (PVC) resin, polymethylmethacrylate (PMMA) resin, epoxy resin, phenol resin, urea resin, melamine resin, and combinations thereof.

In one implementation of the first aspect, the fiber reinforced sheet includes 10% to 90% by weight of the reinforcing fibers based on a total weight of the sheet.

In one implementation of the first aspect, the large-deformable composite farther includes a surface material.

A second aspect of the present disclosure provides a vehicle including the vehicle back beam as defined above.

In one implementation of the second aspect, the vehicle back beam is at least one of a front back beam or a rear back beam. In one example, the vehicle back beam may be applied as a front back beam installed in a front face of a general gasoline/diesel/LPG vehicle. In an alternative, the back beam may be applied as the rear back beam of an electric vehicle to secure a function of protecting a battery pack.

Technical Effects

In accordance with the present disclosure, the large-deformable composite with high elongation and energy absorption performance while securing required mechanical strength and rigidity may be used for the back beam. Thus, collision performance of the back beam is maximized and a weight of the back beam is reduced.

DETAILED DESCRIPTIONS

Figure 1:
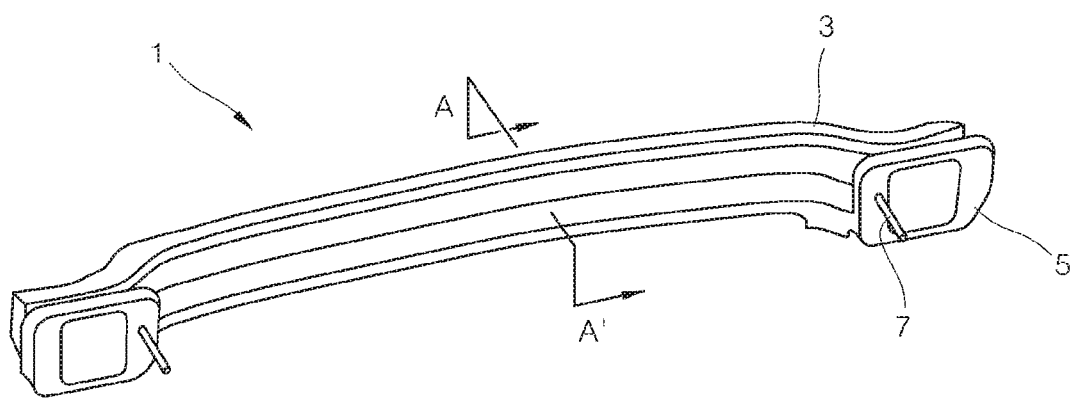
FIG. 1 is a simplified view of a vehicle back beam according to an embodiment of the present disclosure.

Advantages and features of the present disclosure and methods of achieving the advantages and features will become apparent with reference to the following embodiments. However, the present disclosure is not limited to the embodiments disclosed below, but may be implemented in various forms. The present embodiments merely allow the present disclosure to be complete, and fully informs the scope of the present disclosure to those of ordinary skill in the technical field to which the present disclosure belongs. The present disclosure is only defined by the scope of the claims. Like reference numerals refer to like elements throughout drawings.

In the drawings, thicknesses of layers, films, panels, regions, etc., are exaggerated for clarity. In the drawings, for convenience of description, thicknesses of some layers and regions are exaggerated.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Hereinafter, a vehicle back beam according to a preferred embodiment of the present disclosure will be described in detail with reference to the accompanying drawings.

Figure 2:
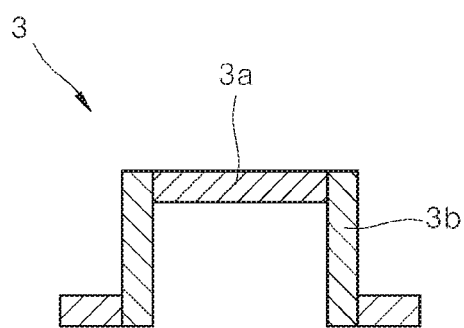
FIG. 2 is an enlarged view of a cross section taken along a line A-A' of FIG. 1.

FIG. 1 is a simplified view of a vehicle back beam according to an embodiment of the present disclosure. FIG. 2 is an enlarged view of a cross section taken along a line A-A' of FIG. 1.

Referring to FIG. 1, a vehicle back beam 1 includes a back beam body 3, a connection plate 5, and a guide pin 7.

The back beam body 3 refer to a body constituting a front back beam or a rear back beam of the vehicle. This body 3 may be used as cushioning means for absorbing impact force via elastic deformation during collision of the vehicle, thereby minimizing physical damage of the vehicle, and improving the safety of the occupants therein.

The connection plate 5 refers to a member that connects the back beam body 3 to a vehicle body.

The guide pin 7 refers to a member that has a protruding shape from the connection plate 5 to select an assembly position when the back beam body 3 is assembled to the vehicle body or to fix the back beam body 3 to the vehicle body.

In FIG. 2, a cross-sectional shape of the back beam body 3 is enlarged in detail.

Referring to FIG. 2, the back beam body 3 has a hat-shaped cross-sectional structure. The back beam body 3 may include a horizontal section 3a for receiving a through-plane directional load and vertical section 3b for receiving an in-plane directional load during vehicle collision.

In this connection, a back beam reinforcing portion made of a large-deformable composite may be formed in at least one section of the back beam body 3, for example, the horizontal section 3a or the vertical section 3b.

In addition, the back beam reinforcing portion made of a large-deformable composite may be formed in all of the horizontal section 3a and the vertical sections 3b constituting the back beam body 3.

The large-deformable composite refers to a material that has high elongation and energy absorption, which can maximize collision performance and can realize weight reduction when applied to the vehicle back beam.

The large-deformable composite according to an embodiment of the present disclosure may include a laminate composed of a plurality of fiber reinforced sheets.

In this connection, the fiber reinforced sheet may include reinforcing fibers with orientation and a resin matrix.

In this connection, the plurality of fiber reinforced sheets may include at least one first fiber reinforced sheet and at least one second fiber reinforced sheet.

Specifically, the first fiber reinforced sheet may refer to a fiber reinforced sheet including reinforcing fibers having an orientation in a first direction having an angle of +1° to +45° with respect to a reinforcement required direction (RRD).

Further, the second fiber reinforced sheet may refer to a fiber reinforced sheet including reinforcing fibers having an orientation in a second direction having an angle of −1° to −45° with respect to the reinforcement required direction (RRD).

As used herein, the term 'reinforcement required direction (RRD)' refers to a predefined direction in which the vehicle back beam are required to be reinforced in terms of strength and rigidity in consideration of external force or load externally applied thereto when the back beam reinforcing portion made of a large-deformable composite reinforces the vehicle back beam.

The large-deformable composite includes a laminate in which a plurality of two types (first and second) of fiber reinforced sheets having the above-described angles with respect to the reinforcement required direction (RRD) are laminated. Thus, the large-deformable composite may improve elongation and energy absorption performance while achieving a certain level of strength and rigidity.

Figure 3:
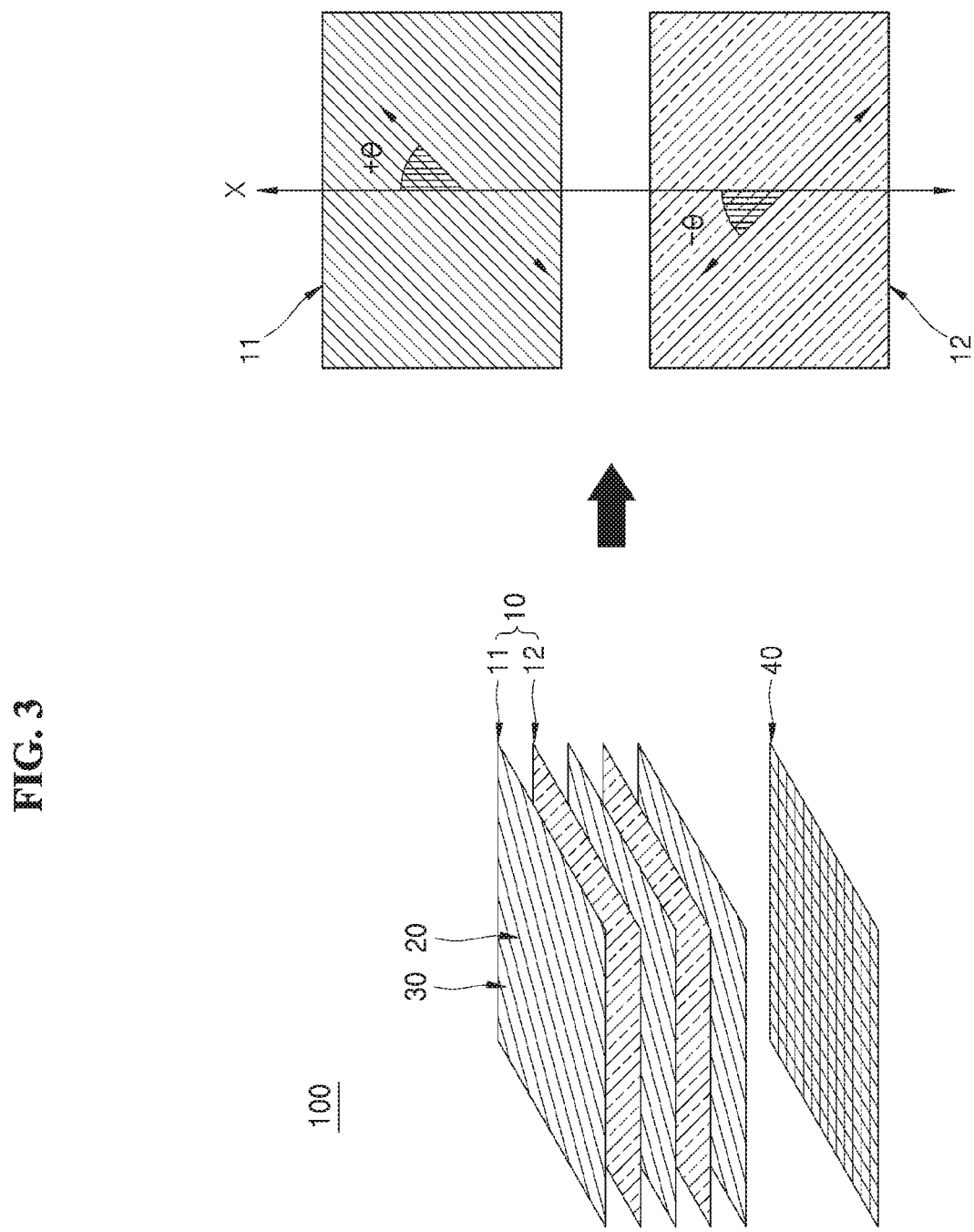
FIG. 3 is an exploded view schematically showing a large-deformable composite used for a vehicle back beam according to an embodiment of the present disclosure.

FIG. 3 is an exploded view schematically showing a large-deformable composite used for a vehicle back beam according to an embodiment of the present disclosure.

Referring to FIG. 3, a large-deformable composite 100 may include a laminate in which a plurality of fiber reinforced sheets 10 are stacked.

In some cases, the large-deformable composite 100 may further include a surface material 40. When the large-deformable composite 100 does not include the surface material 40, the large-deformable composite 100 may have higher efficiency. Thus, whether to include the surface material 40 may be determined properly based on requirements. The surface material 40 may be classified into two types based on roles thereof. Thus, the surface material may have configurations based on the roles. First, when the surface material acts as a carrier (that is, for maintaining a fiber orientation in an undisturbed state when heat is applied during a secondary treatment), the surface material 40 may include a metal mesh, sheet or a composite with a fiber orientation 0° or 90°. Second, when the surface material is a part of a large-deformable composite, the surface material may include a metal sheet.

In this connection, the fiber reinforced sheet 10 may include reinforcing fibers 20 having an orientation and a resin matrix 30. In this connection, a phrase 'having an orientation' means that a single strand of a fiber of reinforcing fibers 20 extends in a direction.

The fiber reinforced sheet 10 containing the reinforcing fibers 20 is referred to as UD sheet (unidirection sheet) or UD prepreg (unidirection prepreg).

The plurality of fiber reinforced sheet 10 may include a first fiber reinforced sheet 11, including reinforcing fibers 20 having an orientation in a first direction having a +θ angle with respect to the reinforcement required direction X and a second fiber reinforced sheet 12 including reinforcing fibers 20 having an orientation in a second direction having an angle of −θ with respect to the reinforcement required direction X.

In this connection, θ may be in a range of 1° to 45°. For example, θ may be approximately 20° to 40°. In another example, θ may be approximately 25° to 40°. However, the present disclosure is not limited thereto.

When the orientation angle of the reinforcing fibers 20 with respect to the reinforcement required direction X satisfies the above θ range, improvement of elongation and energy absorption performance may be maximized.

Further, the orientation angle +θ of the reinforcing fibers of the first fiber reinforced sheet 11 with respect to the reinforcement required direction may be equal to an absolute value of the orientation angle −θ of the reinforcing fibers of the second fiber reinforced sheet 12 with respect to the reinforcement required direction.

When the first fiber reinforced sheet 11 and the second fiber reinforced sheet 12 include the reinforcing fibers having the same absolute value of the orientation angle with respect to the reinforcement required direction of the back beam, post-deformation may be prevented which may otherwise occur when the first fiber reinforced sheet 11 and the second fiber reinforced sheet 12 include the reinforcing fibers having the different absolute values of the orientation angle with respect to the reinforcement required direction of the back beam.

Further, the large-deformable composite may not contain a fiber reinforced sheet containing reinforcing fibers having an orientation having an angle of 0° or 90° with respect to the reinforcement required direction. In other words, the reinforcing fibers of the fiber reinforced sheets constituting the laminate may not have an orientation parallel or perpendicular to the reinforcement required direction.

If the reinforcing fibers have an orientation of 0° with respect to the reinforcement required direction of the back beam, there is a problem that a required level of shock absorption performance may not be secured although mechanical properties may be greatly improved in terms of strength and rigidity. In addition, if the reinforcing fibers have an orientation of 90° with respect to the reinforcement required direction of the back beam, there is a problem in that strength and rigidity are deteriorated.

Further, the laminate composed of the plurality of fiber reinforced sheets may include one or more first fiber reinforced sheets and one or more second fiber reinforced sheets.

Further, the laminate composed of the plurality of fiber reinforced sheet may include the first fiber reinforced sheet and the second fiber reinforced sheet at a lay-up ratio of about 1:2 to about 2:1. In addition, for example, a lay-up ratio may be about 1:1. However, the present disclosure is not limited thereto. In this connection, the lay-up ratio refers to a ratio between the number of the first fiber reinforced sheets and the number of the second fiber reinforced sheets.

Further, the laminate composed of the reinforced sheets may include a stack in which the first fiber reinforced sheets and second fiber reinforced sheets are alternately stacked vertically. In another example, the laminate composed of the reinforced sheets may include a stack in which a plurality of continuously laminated first fiber reinforced sheets and a plurality of continuously stacked second fiber reinforced sheets are stacked vertically.

For example, the first fiber reinforced sheets and the second fiber reinforced sheets may be alternately stacked. In this case, the large-deformable composite may have uniform shock absorbing performance across all directions. Further, an interlayer interfacial separation in the laminate may be prevented which may otherwise occur in a case where a plurality of continuously laminated first fiber reinforced sheets and a plurality of continuously stacked second fiber reinforced sheets are stacked vertically.

Figure 4:
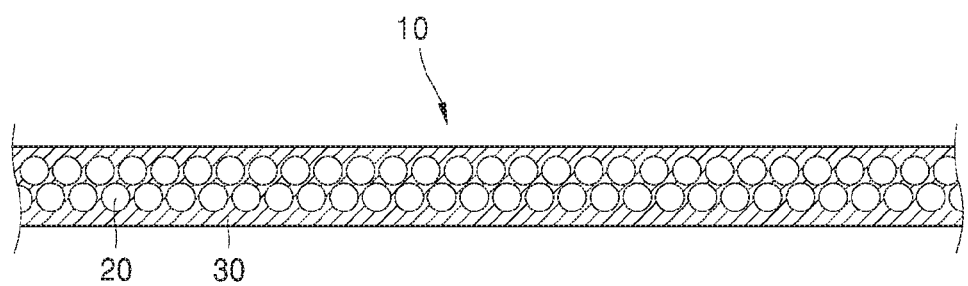
FIG. 4 is a simplified cross-sectional view of a fiber reinforced sheet used in a vehicle back beam according to an embodiment of the present disclosure.

FIG. 4 is a simplified cross-sectional view of a fiber reinforced sheet used in a vehicle back beam according to an embodiment of the present disclosure.

As shown, a fiber reinforced sheet 10 includes reinforcing fibers 20 having an orientation and a resin matrix 30.

For example, the fiber reinforced sheet 10 may have a structure in which the resin matrix 30 is impregnated into between the reinforcing fibers 20.

The reinforcing fibers 20 includes single fiber strands extending in a parallel manner and oriented in one direction. The resin matrix 30 may be impregnated into between the single fiber strands. As such, the resin matrix 30 may well maintain the orientation of the reinforcing fibers 20. Further, the orientation angle of the reinforcing fibers 20 may be easily controlled with respect to the reinforcement required direction.

The reinforcing fibers 20 may include continuous fibers.

In this connection, the term 'continuous fiber' refers to a fiber that is not structurally cut and is long and continuous. Further, the continuous fiber refers to a fiber that is not broken and is formed in a continuous shape along a total size of the fiber reinforced sheet.

When the reinforcing fibers are present in the form of the continuous fibers, the orientation may be well formed and maintained than a case when the reinforcing fibers are present in a form of discontinuous fibers cut in a predefined length, such as long or short fibers.

For example, the reinforcing fibers may include one selected from a group consisting of glass fibers, carbon fibers, aramid fibers, polypropylene fibers, polyethylene terephthalate fibers, polybutylene terephthalate fibers, polyethylene fibers, natural fibers, and combinations thereof. In one example, the reinforcing fibers may include glass fibers or carbon fibers. In this case, a facility therefor may be simply configured. The glass fibers or carbon fibers may be advantageous in terms of price competitiveness over mechanical properties.

The reinforcing fibers refers to a collection of fiber single strands, wherein each fiber single strand may have a cross-sectional diameter, for example, between about 1 μm and about 200 μm, for example, between about 1 μm and about 50 μm, for example, between about 1 μm and about 30 μm, and for example, about 1 μm and about 20 μm. When the fiber single strand of reinforcing fibers has the cross-sectional diameter in the above range, the fiber single strands may be arranged side by side in one layer or multiple layers, such as 30 layers while having the orientation. Further, the impregnation of the resin matrix into between the fiber stands may be easier during the manufacturing of the fiber reinforced sheets.

Further, the fiber reinforced sheet may be formed to an appropriate thickness. As shown in FIG. 4, the structure of the reinforcing fibers 20 in which the single strands of fibers are arranged side by side in two layers is exemplarily illustrated. The present disclosure is not necessarily limited thereto.

The resin matrix 30 includes resins, for example, various kinds of thermoplastic resins or thermosetting resins.

For example, the resin matrix 30 may include one selected from a group consisting of polypropylene (PP) resin, polyethylene terephthalate (PET) resin, polyethylene (PE) resin, polyamide (PA) resin, polytetrafluoroethylene (PTFE) resin, polystyrene (PS) resin, polyphenylene oxide (PPO) resin, polyvinyl chloride (PVC) resin, polymethylmethacrylate (PMMA) resin, epoxy resin, phenolic resin, urea resin, melamine resin and combinations thereof.

When the fiber reinforced sheet includes the above-mentioned thermoplastic or thermosetting resin, it is easy to apply the large-deformable composite to the back beam body 3, more specifically, the horizontal section 3a and vertical section 3b of the back beam of the vehicle (see FIG. 2).

The resin matrix 30 may have a composition in which the resin is a main material and, if necessary, an additive is added thereto. In this connection, the additive may be selected from a group consisting of a heat stabilizer, a coupling agent, a compatibilizer, a plasticizer, a crosslinking agent, and a combination thereof.

Further, the fiber reinforced sheet may include about 10% to about 90% by weight of the reinforcing fibers, for example, about 20 wt % to about 70 wt % thereof.

When the fiber reinforced sheet contains the reinforcing fibers in the above wt % range, this may reinforce the strength and rigidity of the large-deformable composite by a certain level or greater. In addition, it is possible to improve the elongation and energy absorption rate by stacking the fiber reinforced sheets so as to have an appropriate number of layers. In a specific example, the reinforcing sheet preferably has a thickness of approximately 50 μm to 10000 μm.

According to another aspect of the present disclosure, a vehicle may include a vehicle back beam having a back beam body and a back beam reinforcing portion made of a large-deformable composite as described above. In particular, the vehicle back beam may be at least one of a front back beam and a rear back beam. For example, the vehicle back beam may be applied as a front back beam installed in a front face of a general gasoline/diesel/LPG vehicle. In an alternative, the back beam may be applied as the rear back beam of an electric vehicle to secure a function of protecting a battery pack.

As such, when the back beam reinforcing portion made of the large-deformable composite is formed across at least one section of the back beam body, the strength and rigidity similar to those of the steel back beams may be achieved. In addition, the elongation and energy absorption performance can be greatly improved.

When the back beam reinforcing portion made of the large-deformable composite is formed across at least one section of the horizontal section 3a or vertical section 3b of the back beam body, the large-deformable composite 100 may include a laminate composed of the fiber reinforced sheet (that is, the first fiber reinforced sheet) including reinforcing fibers having an orientation in a first direction having a +θ angle with respect to the reinforcement required direction X (see FIG. 3) for each section, and the fiber reinforced sheet (that is, the second fiber reinforced sheet) including reinforcing fibers having an orientation in a first direction having a −θ angle with respect to the reinforcement required direction X (see FIG. 3) for each section. In this connection, θ may be in a range of 1° to 45°.

When the orientation angle +θ of the reinforcing fibers with respect to the reinforcement required direction X meets the range of 1° to 45°, the elongation and energy absorption performance may be improved while the impact resistance of the vehicle back beam may be improved.

In the following, the present examples of the large-deformable composite 100 according to the present disclosure, see FIG. 3 are presented.

PRESENT EXAMPLES AND COMPARATIVE EXAMPLES

Present Example 1

Eight UD sheets were prepared. Each sheet had glass fibers, each having a diameter of 17 μm, and a polypropylene resin matrix impregnated into between the fibers. A thickness of the UD sheet was 300 μm. The UD sheets were laminated. In this connection, a first fiber reinforced sheet A included reinforcing fibers having an orientation in a first direction with an angle of +37° relative to the reinforcement required direction (RRD). A second fiber reinforced sheet B included reinforcing fibers having an orientation in a second direction with an angle of −37° relative to the RRD. An A/B/A/B/A/B/A/B stacked structure was prepared by alternately laminating the first and second sheets A and B at a lay-up ratio of 1:1.

Subsequently, a laminate having a thickness of 2.4 mm was prepared by applying a pressure of 7 tons to the laminated UD sheets at a temperature of 220° C.

Present Example 2

A large-deformable composite of the same thickness in Present Example 1 was fabricated in the same manner as in Present Example 1 except that a first fiber reinforced sheet A included reinforcing fibers having an orientation in a first direction with an angle of +30° relative to the reinforcement required direction (RRD), and a second fiber reinforced sheet B included reinforcing fibers having an orientation in a second direction with an angle of −30° relative to the RRD.

Present Example 3

A large-deformable composite of the same thickness in Present Example 1 was fabricated in the same manner as in Present Example 1 except that a first fiber reinforced sheet A included reinforcing fibers having an orientation in a first direction with an angle of +15° relative to the reinforcement required direction (RRD) and a second fiber reinforced sheet B included reinforcing fibers having an orientation in a second direction with an angle of −15° relative to the RRD.

Present Example 4

A large-deformable composite of the same thickness in Present Example 1 was fabricated in the same manner as in Present Example 1 except that a first fiber reinforced sheet A included reinforcing fibers having an orientation in a first direction with an angle of +37° relative to the reinforcement required direction (RRD), and a second fiber reinforced sheet B included reinforcing fibers having an orientation in a second direction with an angle of −37° relative to the RRD, but an A/A/A/A/B/B/B/B stacked structure was prepared by continuously laminating the first and second sheets A and B at a lay-up ratio of 1:1.

Present Example 5

A large-deformable composite of the same thickness in Present Example 4 was fabricated in the same manner as in Present Example 4 except that a first fiber reinforced sheet A included reinforcing fibers having an orientation in a first direction with an angle of +30° relative to the reinforcement required direction (RRD), and a second fiber reinforced sheet B included reinforcing fibers having an orientation in a second direction with an angle of −30° relative to the RRD.

Present Example 6

A large-deformable composite of the same thickness in Present Example 4 was fabricated in the same manner as in Present Example 4 except that a first fiber reinforced sheet A included reinforcing fibers having an orientation in a first direction with an angle of +15° relative to the reinforcement required direction (RRD) and a second fiber reinforced sheet B included reinforcing fibers having an orientation in a second direction with an angle of −15° relative to the RRD.

Comparative Example 1

A large-deformable composite of the same thickness in Present Example 1 was fabricated in the same manner as in Present Example 1 except that a first fiber reinforced sheet A included reinforcing fibers having an orientation in a first direction with an angle of 0° relative to the reinforcement required direction (RRD), and a second fiber reinforced sheet B included reinforcing fibers having an orientation in a second direction with an angle of 90° relative to the RRD.

Comparative Example 2

A large-deformable composite was fabricated in the same manner as in Example 1.

Comparative Example 3

A large-deformable composite was fabricated in the same manner as in Example 1 except that a further UD sheet identical to the UD sheet described in Present Example 1 was laminated as a surface material such that reinforcing fibers thereof had an orientation with an angle of 0° relative to the reinforcement required direction.

<Evaluation>

Experimental Example 1: Measurement of Tensile Strength

A strength of each of the large-deformable composites of the Present and Comparative Examples was measured by tensioning each composite in the reinforcement required direction. Specifically, the strength was measured according to ASTM D3039 standard. Results are shown in Table 1 below.

Experimental Example 2: Measurement of Elongation

An elongation of each of the large-deformable composites of the Present Examples and Comparative Examples was measured by tensioning each composite in the reinforcement required direction. Specifically, the elongation was measured according to ASTM D3039 standard. Results are shown in Table 1 below.

Experimental Example 3: Measurement of Specific Energy Absorption

A specific energy absorption of each of the large-deformable composites of the Present Examples and Comparative Examples was measured by pulling each composite in the reinforcement required direction. Specifically, an area UT below a stress-strain curve (S-S curve) obtained according to the ASTM D3039 standard was obtained. Then, the specific energy absorptivity of each large-deformable composite was measured based on a following derivation equation. Results are as described in Table 1 below.

$$U_T = \text{lower area below stress-strain curve}$$

$$= MPa \times \%$$

-continued $$= (N \cdot m^{-2} \cdot 10^6) \cdot (m \cdot m^{-1} \cdot 10^{-2})$$
$$= N \cdot m \cdot m^{-3} \cdot 10^4$$
$$= J \cdot m^{-3} \cdot 10^4$$

TABLE 1

|  |  | Surface material | UD sheet thickness [μm] | Stacking scheme | ±θ° | Strength [MPa] | Rigidity [GPa] | Elongation [%] | Specific Energy Absorption [J · m$^{-3}$ · 10$^4$] |
|---|---|---|---|---|---|---|---|---|---|
| Continuous stacking | 1 | — | 300 | Alternated stacking | ±37° | 175 | 7.3 | 14.0 | 1,698 |
|  | 2 | — | 300 | Alternated stacking | ±30° | 266 | 14.2 | 6.8 | 1,281 |
|  | 3 | — | 300 | Alternated stacking | ±15° | 550 | 27.3 | 2.4 | 631 |
|  | 4 | — | 300 | Continuous stacking | ±37° | 92 | 7.2 | 2.1 | 148 |
|  | 5 | — | 300 | Continuous stacking | ±30° | 180 | 14.2 | 2.0 | 169 |
|  | 6 | — | 300 | Continuous stacking | ±15° | 279 | 28.8 | 1.2 | 202 |
| Comparative Examples | 1 | — | 600 | Alternated stacking | 0°, 90° | 402 | 25.8 | 2.3 | 519 |
|  | 2 | — | 600 | Alternated stacking | ±37° | 158 | 7.1 | 14.3 | 1,647 |
|  | 3 | 0° UD sheet | 600 | Alternated stacking | ±37° | 161 | 11.1 | 2.6 | 1,836 |

Referring to Table 1, it may be seen that the large-deformable composite formed across at least one section of the vehicle back beam in accordance with the present disclosure realizes improved elongation and impact absorption performance together with strength and rigidity above a certain level.

Specifically, the large-deformable composite may achieve a strength of about 90 MPa to about 600 MPa, for example, about 150 MPa to about 600 MPa, for example, about 150 MPa to about 300 MPa, for example, about 170 MPa to about 300 MPa. At the same time, the large-deformable composite may achieve a rigidity of about 7 GPa to about 30 GPa, for example, about 7 GPa to about 15 GPa.

The large-deformable composite may achieve the elongation of from about 1% to about 15%, for example, from about 2% to about 15%, for example, from about 5% to about 15% together with the strength and rigidity in the above range. The large-deformable composite may achieve the specific energy absorption of about 140 J·m$^{-3}$·10$^4$ to about 1700·m$^{-3}$·10$^4$, for example, about 600 J·m$^{-3}$·10$^4$ to about 1700 J·m$^{-3}$·10$^4$, for example, about 1200 J·m$^{-3}$·10$^4$ to about 1700 J·m$^{-3}$·10$^4$, for example, about 1650 J·m$^{-3}$·10$^4$ to 1700 J·m$^{-3}$·10$^4$.

In other words, the large-deformable composite according to the present disclosure achieves the strength above a certain level and particularly, high elongation and high shock absorption performance. Thus, the large-deformable composite according to the present disclosure may faithfully perform the reinforcement of the strength and rigidity, at the same time, may have high deformation resistance to the external force and improved shock absorption performance thereto.

As described above, according to the vehicle back beam in accordance with the present disclosure and the vehicle including the same, the back beam reinforcing portion made of the large-deformable composite may be formed across at least one section of the back beam body, for example, the horizontal section 3a (see FIG. 2) for receiving a through-plane directional load in the event of a vehicle collision and the vertical section 3b (see FIG. 2) for receiving an in-plane directional load in the event of a vehicle collision. Thus, the back beam reinforcing portion may secure the required mechanical properties of the back beam in terms of strength and rigidity, while improving the elongation and energy absorption performance of the back beam. Thus, the vehicle back beam in accordance with the present disclosure has the advantageous technical effect that excellent collision performance and vehicle weight reduction may be realized at the same time.

What is claimed is:
1. A vehicle back beam comprising:
a back beam body;
a back beam reinforcing portion formed across at least one section of the back beam body, wherein the back beam reinforcing portion comprises a large-deformable composite,
a connection plate connecting the back beam body to a vehicle body, and
a guide pin having a protruding shape from the connection plate to select an assembly position when the back beam body is assembled to the vehicle body or to fix the back beam body to the vehicle body,
wherein the back beam body has a hat-shaped cross-sectional structure,
wherein the back beam body comprises a horizontal section for receiving a through-plane directional load and a vertical section for receiving an in-plane directional load during vehicle collision, and
wherein the large-deformable composite extends across at least one of the horizontal section or the vertical section of the back beam body,
wherein the large-deformable composite comprises a laminate in which a plurality of fiber reinforced sheets is vertically stacked,
wherein each of the fiber reinforced sheets comprises reinforcing fibers having an extension orientation, and a resin matrix,
wherein the reinforcing fibers comprise continuous fibers,
wherein the resin matrix comprises a thermoplastic resin or thermosetting resin,
wherein the plurality of fiber reinforced sheets comprises:
at least one first fiber reinforced sheet including reinforcing fibers having a first orientation having an angle of +1° to +45° with respect to a reinforcement required direction; and
at least one second fiber reinforced sheet including reinforcing fibers having a second orientation having an angle of −1° to −45° with respect to the reinforcement required direction,
wherein the plurality of fiber reinforced sheet is free of a fiber reinforced sheet including reinforcing fibers having an orientation having an angle of 0° or 90° with respect to the reinforcement required direction,
wherein the laminate comprises the first fiber reinforced sheet and the second fiber reinforced sheet at a lay-up ratio of 1:1, 1:2, or 2:1, wherein the first fiber reinforced sheet and the second fiber reinforced sheet comprise the reinforcing fibers having the same absolute value of the orientation angle with respect to the reinforcement required direction of the back beam, wherein the large-deformable composite further comprises a surface material, wherein the reinforcing fibers include one selected from a group consisting of glass fibers, carbon fibers, aramid fibers, polypropylene fibers, polyethylene terephthalate fibers, polybutylene terephthalate fibers, polyethylene fibers, natural fibers, and combinations thereof, wherein the resin matrix includes one selected from a group consisting of polypropylene (PP) resin, polyethylene terephthalate (PET) resin, polyethylene (PE) resin, polyamide (PA) Resin, polytetrafluoroethylene (PTFE) resin, polystyrene (PS) resin, polyphenylene oxide (PPO) resin, polyvinyl chloride (PVC) resin, polymethylmethacrylate (PMMA) resin, epoxy resin, phenol resin, urea resin, melamine resin, and combinations thereof, wherein the fiber reinforced sheet includes 10% to 90% by weight of the reinforcing fibers based on a total weight of the sheet, wherein the fiber reinforced sheet has a thickness of 50 µm to 10000 µm, and wherein the vehicle back beam is the rear back beam of an electric vehicle to secure a function of protecting a battery pack.

2. A vehicle comprising the vehicle back beam of claim 1.

* * * * *